(12) United States Patent
Laurent et al.

(10) Patent No.: US 7,013,929 B2
(45) Date of Patent: Mar. 21, 2006

(54) SELF-CLOSING THERMAL PROTECTION SHEATH AND ITS METHOD OF FABRICATION

(75) Inventors: Benoît Laurent, Crepy en Valois (FR); Hubert Andrieu, Crepy en Valois (FR); Lucia Della Putta, Compiegne (FR); Patrick Thomas, Crepy en Valois (FR)

(73) Assignee: Federal Mogul Systems Protection Group, Crepy-en-Valois (FR)

( * ) Notice: Subject to any disclaimer, the term of this patent is extended or adjusted under 35 U.S.C. 154(b) by 146 days.

(21) Appl. No.: 10/408,091

(22) Filed: Apr. 8, 2003

(65) Prior Publication Data
US 2003/0221736 A1    Dec. 4, 2003

(30) Foreign Application Priority Data
Apr. 12, 2002    (FR) .................................. 02 04620

(51) Int. Cl.
*F16L 11/00*    (2006.01)
(52) U.S. Cl. ...................... 138/123; 138/110; 138/128; 138/169
(58) Field of Classification Search ................ 138/123, 138/127, 110, 128, 169
See application file for complete search history.

(56) References Cited

U.S. PATENT DOCUMENTS

| | | | | |
|---|---|---|---|---|
| 1,341,987 A | * | 6/1920 | Kline ............................... | 87/7 |
| 1,948,410 A | * | 2/1934 | Williamson, Jr. ............ | 138/127 |
| 3,152,033 A | * | 10/1964 | Black et al. .................. | 428/138 |
| 3,669,157 A | * | 6/1972 | Woodall et al. .......... | 139/387 R |
| 3,888,418 A | * | 6/1975 | Seith et al. .................. | 239/145 |
| 4,189,301 A | * | 2/1980 | Twort ......................... | 432/252 |
| 4,200,126 A | * | 4/1980 | Fish ............................. | 138/143 |
| 4,438,168 A | | 3/1984 | Testard | |
| 4,741,087 A | * | 5/1988 | Plummer, Jr. ................ | 29/446 |
| 4,777,859 A | * | 10/1988 | Plummer, Jr. .................. | 87/7 |
| 4,888,234 A | * | 12/1989 | Smith et al. ................ | 442/371 |
| 4,900,596 A | * | 2/1990 | Peacock ..................... | 428/34.5 |
| 4,946,722 A | * | 8/1990 | Moyer ....................... | 428/36.1 |
| 5,613,522 A | * | 3/1997 | Ford et al. .................. | 138/123 |
| 5,617,900 A | * | 4/1997 | Weil ........................... | 138/127 |
| 5,849,379 A | * | 12/1998 | Gladfelter et al. .......... | 428/35.8 |
| 6,309,721 B1 | * | 10/2001 | Gladfelter et al. .......... | 428/36.1 |
| 6,455,115 B1 | * | 9/2002 | DeMeyer .................... | 428/36.2 |
| 6,571,833 B1 | * | 6/2003 | McLarty et al. ............ | 138/116 |
| 6,586,080 B1 | * | 7/2003 | Heifetz ....................... | 428/198 |
| 2003/0079790 A1 | * | 5/2003 | Atkinson et al. ........... | 138/129 |

FOREIGN PATENT DOCUMENTS

| | | |
|---|---|---|
| FR | 2 789 151 | 8/2000 |
| WO | WO 99/04194 | 1/1999 |

* cited by examiner

*Primary Examiner*—James Hook
(74) *Attorney, Agent, or Firm*—Young & Thompson

(57) ABSTRACT

A self-closing thermal protection sheath includes an interleaved structure comprising firstly a monofilament and secondly strips of metallized foil.

15 Claims, 1 Drawing Sheet

SELF-CLOSING THERMAL PROTECTION SHEATH AND ITS METHOD OF FABRICATION

BACKGROUND OF THE INVENTION

The present invention relates to a self-closing thermal protection sheath.

It also relates to a method of fabricating a self-closing thermal protection sheath.

Generally speaking, the present invention relates to self-closing sheaths used in automobile vehicles to provide mechanical protection for wiring harnesses or fluid pipes in the vehicle.

Sheaths that self-close around wiring harnesses or pipes to provide mechanical and thermal protection thereof are known in the art.

Thus wiring can be protected from infrared radiation by sheaths having a reflective structure.

In particular, woven sheaths in the form of a flat tape to which an aluminized layer is then fixed are known in the art. The sheath is then closed around a wiring harness and held in place by VELCRO™ and/or adhesives.

Glass fiber and/or polyester woven tapes that are thermoformed to a tubular shape are also known in the art. An aluminized foil can be provided on the external surface of the self-closing tubular sheath.

Thus the sheath can be fitted and automatically closed around a wiring harness. Closure adhesives then keep it closed, especially at bends, where the self-closing sheath tends to open.

SUMMARY OF THE INVENTION

An object of the present invention is to propose an improved self-closing thermal protection sheath.

To this end, it provides a self-closing sheath, that includes an interleaved structure comprising firstly a monofilament and secondly strips of metallized foil.

This yields a unique structure that has the special feature of a reflective surface able to protect wiring from infrared radiation.

Furthermore, this structure with no attached aluminized foil is flexible so the sheath can be conformed better when fitted to elongate members, especially at bends.

According to a preferred feature of the invention, the sheath has a woven structure comprising a monofilament as the weft filament and strips of metallized foil as warp filaments.

This structure can be produced by a conventional loom, the monofilament conferring stiffness on the flexible sheath.

The strips of metallized foil preferably consist of a polyester film aluminized on both sides.

Thus the strips can be obtained by cutting them out from a polyester film.

According to another aspect of the invention, a method of fabricating the above kind of self-closing sheath includes the following steps:

producing an interleaved structure in the form of a flat tape comprising firstly a monofilament and secondly strips of metallized foil, and thermoforming said flat tape into a tubular self-closing sheath.

The interleaved structure can therefore be made flat and then thermoformed into a split tubular sheath so that it can be fitted around elongate members simply by spreading apart the edges of the sheath and then closing the sheath up around the members concerned.

Other features and advantages of the invention will become more apparent in the course of the following description.

BRIEF DESCRIPTION OF THE DRAWINGS

In the appended drawings, which are provided by way of nonlimiting example only.

DETAILED DESCRIPTION OF THE PREFERRED EMBODIMENTS

Figure 1:
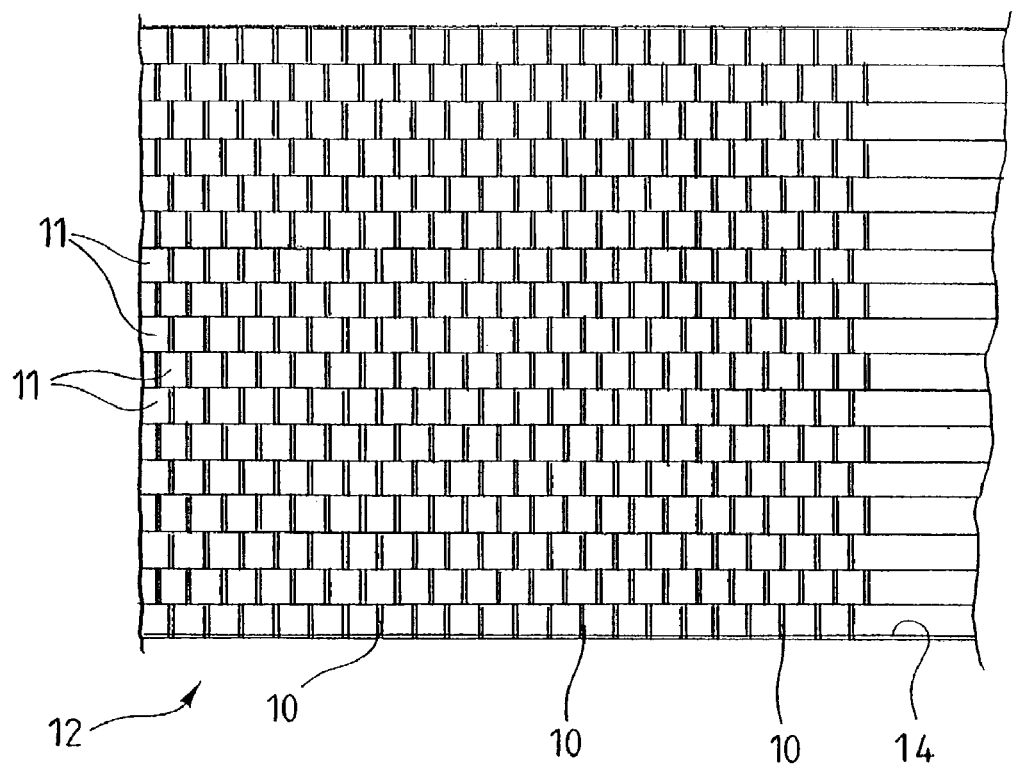
FIG. 1 is a view of a portion of a sheath according to the invention before thermoforming.
Figure 2:
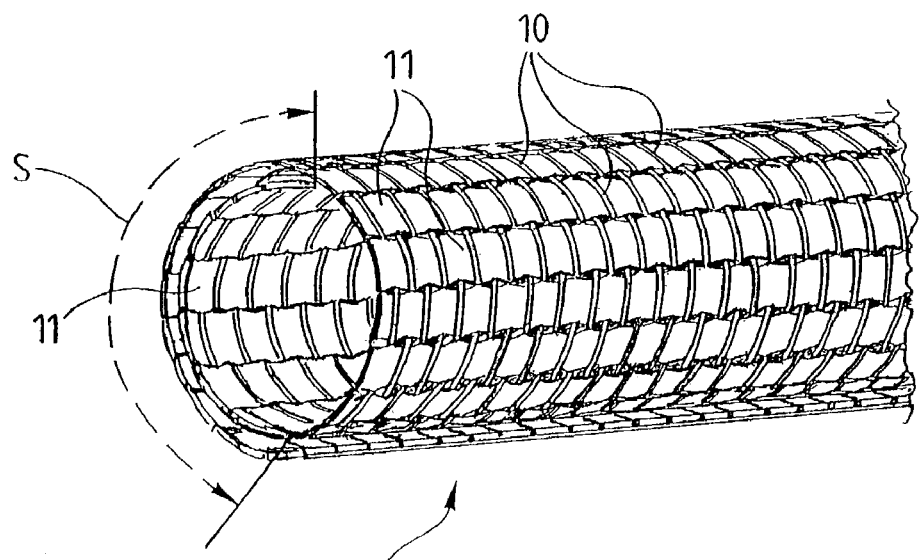
FIG. 2 is a partial perspective view of a self-closing sheath according to the invention.

One embodiment of a self-closing thermal protection sheath according to the invention is described first with reference to FIGS. 1 and 2.

The thermal protection sheath has an interleaved structure comprising a monofilament 10 and strips of metallized foil 11.

The interleaved structure is woven in the conventional way with a weft thread and warp threads.

Of course, other interleaved structures could be used, in particular a knitted or braided structure, and possibly produced directly in a tubular form.

The weft filament of the woven structure is a monofilament.

The monofilament can be a polyester filament with a diameter from 0.1 mm to 0.5 mm.

This kind of polyester monofilament can withstand high temperatures, of the order of 150° C., and impart some strength to the self-closing sheath.

The warp filaments of the woven structure are strips of metallized foil.

The metallized foil strips are preferably strips of polyester film aluminized on both sides.

Thus aluminized polyester films available off the shelf can be cut into strips. The strips can be formed into a spool ready for subsequent use on a loom.

It will be noted that it is beneficial if the aluminized foil does not incorporate any varnish that could absorb some of the infrared radiation and thereby reduce the reflective power of the thermal protection sheath.

The strips of metallized foil are preferably from 2 mm to 5 mm wide.

Generally speaking, the strips could be from 1 mm to 15 mm wide.

The Applicant has fabricated sheaths with strips 3 mm wide, producing an entirely satisfactory woven structure.

The woven tape further includes a selvage filament 14 parallel to the strips 11 of metallized foil.

The selvage filament is woven with the strips and therefore extends along a longitudinal edge of the sheath.

The selvage filament limits fraying of the sheath. It may be beneficial to use a colored filament as the selvage filament, firstly so that its presence can easily be detected (its absence constitutes a defect) and secondly so that the "bound" edge of the fabric can easily be identified.

As shown clearly in FIG. 2, the self-closing sheath thus assumes a tubular shape having an overlapping portion S subtending an angle from 45° to 180°.

In this example the overlapping portion subtends an angle of substantially 180°.

This relatively wide overlapping portion means that the thermal protection sheath can be fitted to wiring harnesses and pipes with different diameters with guaranteed closure of the sheath by overlapping of the edges.

Thus a reflective structure is obtained from the strips of aluminized foil, requiring no addition of an attached aluminum foil.

This one-piece structure yields a flexible sheath that can be fitted to wiring harnesses and pipes of diverse shapes.

A method of fabricating the above kind of self-closing sheath is described next.

In practice, an interleaved structure is produced first, for example a woven structure, in the form of a flat tape 12 as shown in FIG. 1, for example.

Thus a conventional loom can be used to weave a flat tape from a monofilament and strips of metallized foil.

The flat tape is then thermoformed into a self-closing tubular sheath 13 shown in FIG. 2.

The step of weaving the flat tape uses as the weft filament a monofilament, for example a polyester monofilament, and as warp filaments strips of metallized foil made from an aluminized polyester film.

The thermoforming step preferably includes the following substeps:

cold forming the flat tape into a tubular shape, with an overlapping area subtending an angle of less than or equal to 180°.

Thus the tape can be cold-formed around a former of appropriate shape so that an overlapping area is produced.

heating the cold-formed tubular shape;

The heating temperature is between the temperature at which the polyester softens and the temperature at which it melts. This heating step is of relatively short duration, generally one minute or less.

cooling the thermoformed sheath.

The heated sheath is then cooled rapidly, generally by contact with the surrounding air.

Thanks to the softening and cooling of the polyester filament, the sheath treated as above remains closed, with an overlapping portion.

Of course, many modifications can be made to the embodiment described above without departing from the scope of the invention.

In particular, the self-closing thermal protection sheath could be produced by a different fabrication method, for example with a braided or knitted structure.

The interleaved structure could be produced directly in a tubular form, requiring no thermoforming of the resulting tape.

Furthermore, the woven structure could include a selvage filament on each longitudinal edge of the sheath.

Finally, the interleaved structure could include two layers, namely a first layer comprising the strips of metallized foil interleaved with a monofilament, adapted to reflect infrared radiation, and a second layer, for example a layer of glass fibers, adapted to insulate the wiring or pipes from heat transmitted by convection or conduction.

The interleaved structure could be obtained by a double-sided weaving method, the side with the glass fibers constituting the interior face of the tubular sheath.

What is claimed is:

1. A self-closing sheath, comprising a woven structure comprising a monofilament as the weft filament interwoven with strips of metallized foil as warp filaments in order to form a thermal protection self-closing sheath with a reflective surface.

2. The self-closing sheath according to claim 1, wherein the strips of metallized foil consist of a polyester film aluminized on both sides.

3. The self-closing sheath according to claim 2, wherein the strips of metallized foil are from 2 mm to 5 mm wide.

4. The self-closing sheath according to claim 2, wherein the monofilament is a polyester filament with a diameter from 0.1 mm to 0.5 mm.

5. The self-closing sheath according to claim 2, that comprises an overlapping portion subtending an angle from 45° to 180°.

6. The self-closing sheath according to claim 1, wherein the strips of metallized foil are from 2 mm to 5 mm wide.

7. The self-closing sheath according to claim 6, wherein the monofilament is a polyester filament with a diameter from 0.1 mm to 0.5 mm.

8. The self-closing sheath according to claim 6, that comprises an overlapping portion subtending an angle from 45° to 180°.

9. The self-closing sheath according to claim 1, wherein the monofilament is a polyester filament with a diameter from 0.1 mm to 0.5 mm.

10. The self-closing sheath according to claim 9, that comprises an overlapping portion subtending an angle from 45° to 180°.

11. The self-closing sheath according to claim 1, that comprises an overlapping portion subtending an angle from 45° to 180°.

12. The self-closing sheath according to claim 1, further comprising at least one selvage filament parallel to the strips of metallized foil and extending along a longitudinal edge of said sheath.

13. A method of fabricating a self-closing sheath comprising a reflective surface having monofilaments interleaved with strips of metallized foil, the method includes the following steps:

producing an interleaved structure in the form of a flat tape comprising a monofilament interleaved with strips of metallized foil, and thermoforming said flat tape into a tubular self-closing sheath with a reflective surface.

14. The fabrication method according to claim 13, wherein the step of producing an interleaved structure includes weaving a flat tape comprising a monofilament as weft filament and strips of metallized foil as warp filaments.

15. The method according to claim 13, further comprising the step of placing at least one selvage filament along a longitudinal edge of said sheath, parallel to said strips of metallized foil.

* * * * *